United States Patent [19]
Ritter

[11] Patent Number: 5,545,799
[45] Date of Patent: Aug. 13, 1996

[54] CHEMICAL DESTRUCTION OF TOXIC ORGANIC COMPOUNDS

[76] Inventor: Robert A. Ritter, 407–1274 Barclay Street, Vancouver, British Columbia, Canada, V6E 1H3

[21] Appl. No.: 39,889

[22] Filed: Mar. 30, 1993

[51] Int. Cl.⁶ .................................................... A62D 3/00
[52] U.S. Cl. ................................................................ 588/200
[58] Field of Search .............................................. 588/200

[56] References Cited

U.S. PATENT DOCUMENTS

| | | | |
|---|---|---|---|
| 3,719,570 | 3/1973 | Lancy | 204/151 |
| 3,810,788 | 5/1974 | Steyermark | 588/200 |
| 4,449,005 | 5/1984 | Davis et al. | 568/59 |
| 4,565,787 | 1/1986 | Bossle et al. | 436/120 |
| 4,744,917 | 5/1988 | Scavdera et al. | 252/187.28 |
| 4,797,128 | 1/1989 | Fowler | 8/137 |
| 4,949,641 | 8/1990 | Sayles | 588/200 |

*Primary Examiner*—Edward A. Miller
*Attorney, Agent, or Firm*—Harry M. Weiss; Jeffrey D. Moy; Harry M. Weiss & Associates, P.C.

[57] ABSTRACT

A sequential process is provided for the destruction of a toxic organic chlorine-containing compound, especially a chlorine- and arsenic-containing compound e.g., a Lewisite or a mustard gas. The process includes the first step of carrying out an oxidizing reaction between the chlorine-containing compound, and an oxidizing agent, especially hydrogen peroxide, while maintaining the temperature and the pH within preselected ranges e.g., about 50° C. to about 90° C. and the pH starting at about 1 to about 2 during the oxidation and terminating at about 5 to about 8 to provide an oxidation product of the original toxic organic chlorine-containing compound, original toxic chlorine- and arsenic-containing compound. After completion of the oxidizing reaction, any residual oxidizing agent is preferably catalytically decomposed. Then, the oxidation product of the original toxic organic chlorine-containing compound, is decomposed at an alkaline pH, e.g., to a maximum final pH of about 11 to provide an inorganic compound, e.g., an inorganic arsenic-containing compound. Such compound can easily and safely be disposed of.

19 Claims, 1 Drawing Sheet

CHEMICAL DESTRUCTION OF TOXIC ORGANIC COMPOUNDS

BACKGROUND OF THE INVENTION a) Field of the Invention

This invention relates to procedures and apparatus useful for safely destroying toxic chlorine- and arsenic-containing chemicals, and toxic chlorine- and sulfur-containing chemicals, e.g., obsolete chemical warfare agents.

b) Description of the Prior Art

In recent years with the global emphasis on the reduction of the huge stockpile of chemical warfare agents, the art has been confronted with the problem of safely destroying and disposing of a variety of obsolescent chemical warfare agents, e.g., mustard gas and Lewisite.

Large quantities of chemical warfare agents, in various forms, are contained in a wide spectrum of munitions ranging from tactical ordnance to ballistic missiles, while equally large quantities are found in storage vessels with capacities ranging from a few grams to several tonnes. The problem of treatment and disposal is, therefore, severely complicated, not only by the extreme toxicity of quite infinitesimal quantities of these agents, but also by the need to simplify their recovery and to minimize the number of transfer and handling steps.

Where the technique of incineration is permitted, certain of these agents, including mustard gas and the nerve gases, may be totally destroyed through thermal oxidation, since the products of combustion, e.g., sulfur dioxide, may be readily contained and prevented from escaping to the atmosphere.

On the other hand, the Lewisites, [i.e., dichloro(2-chlorovinyl)arsine, bis(2-chlorovinyl)chloroarsine and tris(2-chlorovinyl)arsine], which comprises approximately 36 weight percent arsenic, upon combustion produce the highly toxic arsenic trioxide. Under conditions normally experienced in incinerator operation, it is extremely difficult to limit the release of this contaminant to the atmosphere at acceptably low rates.

Numerous chemical neutralization techniques have been proposed in the literature based on an alkaline oxidation, e.g., as taught in Canadian Patent No. 304,110 patented Sep. 23, 1990 by C. D. Carpenter. A large proportion of these techniques are based on hydrolysis of the Lewisite I in an aqueous alkaline medium. The reaction involved may be represented by the equation:

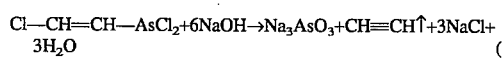

(1)

Although the hydrolysis approach, especially at somewhat elevated temperatures, is capable of effectively destroying virtually all of the principal Lewisite specie, known as Lewisite I, the associated species, Lewisite II and Lewisite III (previously generically-termed "the Lewisites") are considerably more resistant to hydrolysis and will, to a considerable extent survive this treatment. The secondary species, though milder vesicants than the principal analogue, are nonetheless toxic and cannot be tolerated as a component of the reaction products.

Another undesirable feature of the hydrolysis procedure is the formation of a trivalent arsenic compound, sodium arsenite which represents one of the most toxic forms of arsenic. Moreover, since this product is extremely soluble, some considerable difficulty is encountered in achieving its secure, permanent disposal.

A second popular approach suggested in the literature involves oxidation of the Lewisite with the aid of some oxidizing agent, e.g., sodium hypochlorite (NaOCl), chlorine ($Cl_2$), hydrogen peroxide ($H_2O_2$) or nitric acid ($HNO_3$).

Although complete oxidation may be possible with the nitric acid, reagents, e.g., hypochlorites and peroxides were, under the conditions investigated, found to be capable of only partial oxidation in accordance with the following reactions:

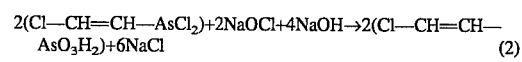

(2)

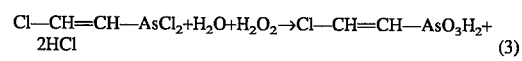

(3)

In each instance, a final product of the reaction is a chlorovinyl arsonic acid which, though less noxious than the original Lewisite, is nevertheless highly toxic and represents a significant final disposal problem.

It should be noted that products analogous to the arsonic acid produced by the oxidation of Lewisite I are derived from similar oxidations of Lewisite II and Lewisite III and that these constitute comparable disposal problems.

SUMMARY OF THE INVENTION a) Aims of the Invention

In view of these considerations, a more attractive approach to the neutralization of the Lewisites would be based on some form of chemical decomposition, especially if this procedure could be accomplished at moderate temperatures and if the resulting arsenic compounds were readily disposable and of minimal toxicity.

A principal object of the present invention is to provide a novel process for the chemical destruction of toxic organic chlorine- and arsenic-containing compounds, and toxic organic chlorine- and sulfur-containing compounds, e.g., the Lewisites, and mustard gases, under modest reaction conditions of temperature and pressure to generate reaction products which are of minimal toxicity and which readily permit safe and permanent disposal by conventional means.

Another object of the present invention is to provide a novel apparatus for the carrying out of the above chemical destruction which utilizes unsophisticated processing equipment and procedures.

b) Statements of Invention

The present invention provides a sequential process for the destruction of a toxic organic chlorine-containing compound selected from the group consisting of the mustard gases, and the Lewisites comprising the two sequential steps of: (A) first carrying out an oxidation reaction between the chlorine-containing compound and an oxidizing agent by adding the chlorine-containing compound to an aqueous solution of the oxidizing agent, while maintaining the temperature within the range of about 50° C. to about 90° C. and the pH starting at about 1 to 2 during the oxidation and terminating at about 5 to about 8, thereby to provide an oxidation reaction product solution; and (B) then converting the oxidation reaction product solution into inorganic compounds by carrying out a neutralization reaction by the addition of an aqueous solution of an alkali to a maximum final pH of about 11.

This invention also provides a sequential batch chemical apparatus comprising: (A) a main reactor; (B) a source of a first chemical reactant operatively connected to an inlet to the main reactor; (C) a source of a second chemical reactant operatively connected to another inlet to the main reactor; (D) a source of a third chemical reactant operatively connected to yet another inlet to the main reactor; (E) a source of an inert blanketing gas operatively connected to still another inlet to the main reactor; (F) an interim storage tank selectively operatively connected to an outlet from the main reactor; (G) a hot exchanger selectively operatively connected to the outlet from the main reactor and selectively operatively connected to a main inlet to the main reactor vessel; (H) a cold exchanger selectively operatively connected to the outlet from the main reactor and selectively operatively connected to a main inlet to the main reactor; (I) a catalyst-containing vessel selectively operatively connected to an outlet from either the hot exchanger or the cold exchanger and selectively operatively connected to a main inlet to the main reactor; (J) a liquid knockout vessel operatively connected to an outlet from an upper portion of the main reactor, the liquid knockout vessel having a lower liquid discharge and an upper gaseous discharge operatively connected to an absorber vessel which is vented to a flare, or to an incinerator or to a carbon bed.

c) Other Features of the Invention

By one feature of the invention, the toxic, organic, chlorine-containing compound is a Lewisite selected from the group consisting of dichloro-(2-chlorovinyl)arsine, bis(2-chlorovinyl)chloroarsine and tris(2-chlorovinyl)arsine; the oxidation reaction product includes an organic chlorine-containing arsonic acid; the residual oxidizing agent is catalytically-decomposed after completion of the oxidation reaction; the organic chlorine-containing arsonic acid is decomposed to an inorganic arsenate salt by increasing the pH to an alkaline level; and the inorganic arsenate salt is fixated and disposed of.

By one feature of the invention, the Lewisite is added to the oxidizing agent, e.g., where the oxidizing agent is hydrogen peroxide, which may be employed as an approximately 5% to 30% aqueous solution, e.g., an approximately 10% to 25% aqueous solution, preferably used in stoichiometric excess, e.g., of about 400%.

By another feature of the invention, the oxidation is carried out at a temperature of about 75° C. to 85° C., especially where the oxidation is terminated at a pH of about 6, e.g., where the pH is maintained by the addition of sodium hydroxide.

By yet another feature of the invention, the catalyst is manganese dioxide and the catalytic decomposition is carried out at a pH of about 6.

By still another feature of the invention, the decomposing of the organic arsonic acid is carried out with sodium hydroxide at a pH of about 11, and the total quantity of sodium hydroxide required is 3 moles per mole of the Lewisites.

By still another feature of this invention, the process includes the step of converting the inorganic sodium-containing and arsenic-containing compound to inorganic calcium-containing and arsenic-containing compounds; and then chemically fixating and decomposing the inorganic calcium-containing and arsenic-containing compound.

By yet a further feature of the invention, the stabilization of the arsenate salt is carried out by the steps of precipitating the arsenate as calcium arsenate by the addition of a calcium donor, and then stabilizing the precipitate within a cement monolith.

By a still further feature of the invention, the stabilization of the arsenate salt is carried out by the steps of chemically entrapping the arsenate salt in silicate by adding sodium silicate and sodium sulfate to the reaction product and then stabilizing such product within a cement monolith.

By features of the apparatus of this invention, the apparatus may further include one or more of: an in-line mixer to mix reactants which are fed to the main reaction vessel; a probe to monitor temperature and pH; and a spray nozzle at the upper portion of the main reaction vessel.

d) Generalized Description of the Invention

In one specific feature, the present invention provides a process for performing the cyclic, batchwise neutralization operation of a Lewisite by the following steps. Firstly, placing an oxidizing agent in a reaction vessel, secondly, slowly introducing a Lewisite feed while maintaining both the temperature and the pH of the highly exothermic reaction mixture at the desired level. Thirdly, catalytically decomposing the residual oxidizing agent at the end of the oxidation stage. Fourthly, elevating the pH of the reaction mixture to effect decomposition of the Lewisite oxidation products. Finally, removing the resulting inorganic products from the reactor in preparation for the next cycle.

The present invention also provides an integrated series of apparatus units, namely a reactor vessel, a catalyst chamber, Lewisite and reagent feed storage vessels, heat exchangers, pumps, valves and automatic controllers for performing the necessary chemical neutralization operations.

The present invention thus provides a series of chemical treatment steps, carried out in a series of apparatus units involving oxidation, preferably (and essentially for Lewisite) followed by decomposition effectively to neutralize either or all of the three forms of the Lewisite and to produce inorganic reaction products which are readily disposable.

The oxidizing agent is preferably an approximately 5% to 30% aqueous solution of hydrogen peroxide. Although the equation (described above) indicates that one mole of peroxide is required to oxidize one mole of the Lewisite, actual consumption of this reagent is approximately 3 to 4 moles peroxide per mole of the Lewisite, due to decomposition of peroxide by impurities in the Lewisite, and the need to provide an excess to favour the oxidation reaction.

During the course of the oxidation, the pH is permitted to decrease to a level of about 1 to 2 pH units through systematic addition of an alkaline solution, e.g., aqueous sodium hydroxide. Following addition of the total quantity of the Lewisite, and prior to termination of the oxidation phase for a given batch, the pH is increased to a level of about 5 to 8 pH units through the further addition of the alkali solution. This reagent neutralizes the hydrogen chloride produced in the oxidation reaction illustrated in equation (3), thereby enhancing the destruction of the final traces of the Lewisite by limiting the extent of the reverse reaction. The sodium hydroxide consumed in this operation is approximately 2 moles per mole of the Lewisite. Temperature regulation in the range of 50° C. to 90° C. is achieved both through regulation of the Lewisite feed to the reactor and by circulating the reaction mixture through a heat exchanger at a controlled rate.

The oxidation reaction is terminated with an excess of peroxide remaining in the reaction vessel, with a residual Lewisite concentration of less than 1 mg/L and with a pH in the range of about 5 to 8.

The excess peroxide is destroyed by circulating the reaction mixture through a bed of catalyst, e.g., manganese dioxide, at a controlled rate to limit the temperature rise and to prevent an uncontrollable rate of oxygen generation and, hence, foaming. The decomposition reaction, which reduces the residual peroxide to less than 0.1%, may be represented by the equation:

$$2H_2O_2 + (catalyst) \rightarrow 2H_2O + O_2. \quad (4)$$

During the peroxide removal process, the pH is maintained at a level of about 5 to 7 through the addition of aqueous sodium hydroxide. Total consumption of alkali for this purpose is approximately 0.12 moles per mole of original Lewisite feed. Control of the pH at this stage is rather critical since, at levels which are too low, e.g., less than 4, the rate of catalytic peroxide decomposition is extremely low while at a high pH, e.g., above about 9, both acetylene and oxygen may be evolved simultaneously, thereby creating a potentially explosive mixture.

In the interests of safety, the reactor is purged with nitrogen during the peroxide decomposition reaction to ensure that all of the oxygen is removed prior to the next step which unavoidably involves acetylene evolution.

The arsonic acid product, formed by the oxidation reaction, illustrated in equation (3), is decomposed, under a constantly purging nitrogen blanket, by the upward adjustment of the pH to a level ranging from 10 to 12 through the addition of a 10% to 30% aqueous solution of an alkali, e.g., to sodium arsenate by the addition of sodium hydroxide. This reaction may be represented by the equation:

$$Cl-CH=CH-AsO_3H_2 + 4NaOH \rightarrow Na_3AsO_4 + CH\equiv CH\uparrow + NaCl + 2H_2O. \quad (5)$$

Due to the hazards associated with the acetylene evolved during the course of this slightly exothermic reaction, alkali addition is carefully controlled at a low rate, the reaction mixture is both stirred vigorously and circulated through the heat exchanger and the system is continuously purged to a vent (or through a carbon bed, or to a combustion device under those circumstances where the acetylene content rises above acceptable levels for venting) with the aid of a high flow rate of an inert gas, e.g., nitrogen.

The sodium hydroxide consumed during the acid decomposition operation identified by equation (5), is approximately 0.7 moles per mole of the Lewisite feed.

The oxidizing agent should be hydrogen peroxide employed as an approximately 10% to 25% aqueous solution, since this reagent is both highly efficient in destroying the Lewisite and it is more safely handled than the conventional alternatives. To accommodate both peroxide decomposition losses and to ensure complete destruction of the Lewisite, the excess peroxide initially charged to the reactor should be approximately 400% above the stoichiometric requirement.

The preferred pH of the reaction mixture is about 1–2 during Lewisite oxidation and about 6 at the end of Lewisite oxidation, about 6 during excess peroxide decomposition, and about 11 during the final decomposition of the arsonic acid. The preferred alkali for the oxidation, the peroxide decomposition and the arsonic acid decomposition processes is sodium hydroxide, since this reagent is relatively inexpensive, readily available and entirely suited to its purpose. The total quantity of sodium hydroxide required for the combined operations is about 3 moles per mole of the Lewisite charged.

The desired reaction temperature for each stage of the process is about 75° C. to about 85° C. since, at this level, boiling of the aqueous charge is easily avoided, while the rates of the desired reactions are high and readily controllable.

The sequence of introducing the major reactants to the system should comprise a pre-charging of the reactor with the oxidizing agent followed by the gradual introduction of Lewisite at a rate which permits reliable maintenance of the desired reaction temperature. The addition of peroxide to a charge of the Lewisite is a less desirable procedure since, in the event of an emergency, the larger quantity of the warfare agent present in the system throughout the course of the reaction constitutes a substantially more serious hazard.

The preferred catalyst for the excess peroxide destruction process is manganese dioxide, since it affords satisfactory control of the decomposition reaction. Moreover, it is readily available and is stable in and essentially unaffected by the reaction mixture.

Disposal of the sodium arsenate product from the decomposition reaction illustrated in equation (5) may be accomplished by precipitating the arsenate as calcium arsenate through the addition of a calcium donor, e.g., calcium chloride. The resulting precipitate is then stabilized within a cement monolith, created in the conventional manner well known in the hazardous waste treatment industry.

Stabilization of the sodium arsenate may, alternatively, be accomplished by adding sodium silicate and sodium sulfate to the reaction product identified in equation (5), each in a ratio of approximately 1 part reagent to 8 parts reaction product. The resulting mixture, in which the arsenic has become chemically entrapped by the silicate, is then incorporated into a cement monolith similar to that indicated above.

The preferred method for stabilizing the sodium arsenate product comprises the formation of a cement-based monolith through the thorough blending and curing of the following mixture of ingredients: 40 parts of the total reaction mixture; 5 parts of sodium silicate; 5 parts sodium sulfate, and 50 parts Portland cement.

In respect of the destruction of mustard gas, the chemical reactions may be specified as follows:

REACTIONS

First Step:

$$(Cl-CH_2-CH_2)_2S + 2H_2O_2 \rightarrow (Cl-CH_2-CH_2)_2SO_2 + 2H_2O$$

Second Step:

$$(Cl-CH_2-CH_2)_2SO_2 + 6Ca(OCl)_2 + 6Ca(OH)_2 \rightarrow CaSO_4 + 4CaCO_3 + 7CaCl_2 + 10H_2O$$

Overall Reaction:

$$(Cl-CH_2-CH_2)_2S + 2H_2O_2 + 6Ca(OCl)_2 + 6Ca(OH)_2 \rightarrow CaSO_4 + 4CaCO_3 + 7CaCl_2 + 12H_2O$$

BRIEF DESCRIPTION OF THE DRAWINGS

In the accompanying drawing, the single FIGURE is a schematic representation of one embodiment of apparatus units useful for carrying out the process of the present invention.

DESCRIPTION OF THE DRAWING

Figure 1:
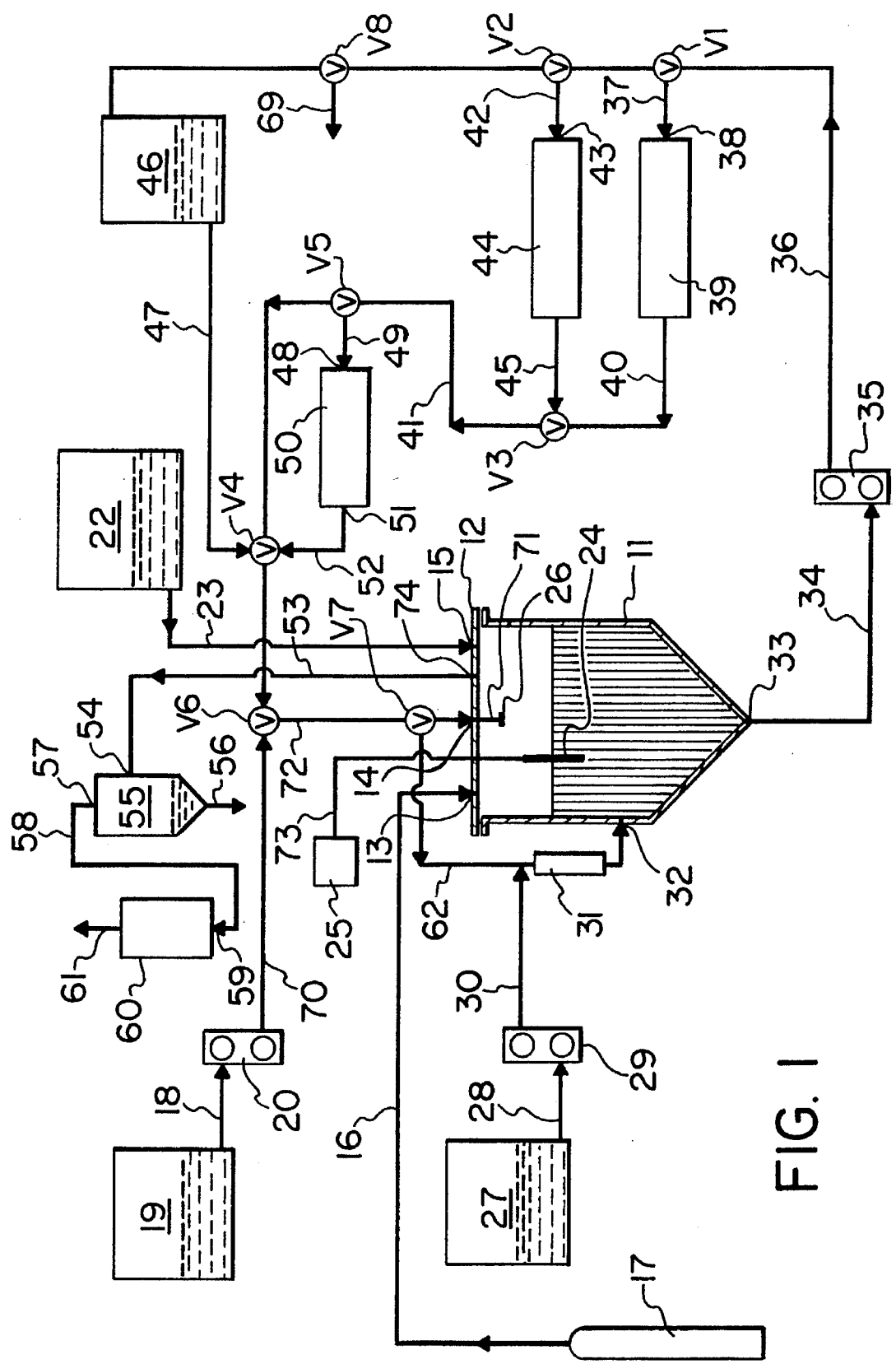

As seen in the drawing, the sequential batchwise apparatus includes a reactor 11 provided with a sealing cover 12 having three inlet ports 13, 14, 15. Inlet port 13 is connected by line 16 to a nitrogen source 17 to provide a nitrogen blanket, as required, in reactor 11. Inlet port 14 is connected via line 72 through valve V6 to line 70 from pump 20 which can pump a neutralizing agent, e.g., NaOH, from tank 19 by way of line 18. Inlet port 14 is connected via line 71 to spray nozzle 26 within the vessel 11. Inlet port 15 is connected to tank 22 via line 23 to feed oxidizing agent, e.g., $H_2O_2$, within tank 22 to reactor 11.

Vessel 27 is connected through outlet line 28 and pump 29 to feed line 30, which is connected to in-line mixer 31 and to peripheral inlet port 32 of the reactor 11, to feed the toxic, organic, arsenic-containing compound to be destroyed, e.g., either one or all of the three Lewisites, from vessel 27 to the reactor 11.

The lower discharge outlet 33 of the reactor 11 is connected via outlet line 34 and pump 35 to main flow line 36. A first branch line 37 at valve V1 is connected to the inlet 38 of cold exchanger 39, the outlet line 40 thereof being connected via recycle lines 41,72 to the flow direction valve V7. Valve V7 diverts the flow to inline mixer 31 through line 62 for feeding to the vessel 11 via peripheral inlet port 32. A second branch line 42 is connected at valve V2 to the inlet 43 of hot exchanger 44, the outlet line 45 thereof being connected via flow direction valve V3 to recycle lines 41,72 and thence to the flow direction valve V7. Valve V7 diverts the flow to inline mixer 31 through line 62 for feeding to the vessel 11 via peripheral inlet port 32.

Main flow line 36 also is connected to an interim storage tank 46 whose outlet line 47 is connected to recycle line 41 at control valve V4. In addition, main flow line is connected, at valve V8 to withdrawal line 69 for discharge of product to stabilization and disposal.

Recycle line 41 is connected by line 49, at valve V5, to the inlet 48 of a regeneration vessel 50, the outlet 51 thereof being connected by line 52 to recycle line 41 at control valve V4.

The conditions within reactor 11 are monitored by means of pH and temperature probe 24 connected to monitor 25 by line 73.

A vapor line 53 is connected between upper outlet 74 of reactor 11 and a liquid knockout vessel 55 at inlet 54. The outlet 57 of knockout vessel 55 is connected by line 58 to the inlet 59 of an absorber 60 which vents, by line 61, to flare, if required, or to a carbon bed.

DESCRIPTION OF PREFERRED EMBODIMENTS

The operation of the process of one embodiment of this invention preferably involves the following steps: a quantity of about 10% to 25% aqueous hydrogen peroxide, equal in molar terms to five times the quantity of Lewisite to be neutralized in each batch, is transferred from the vessel 22 to the reactor 11 and is heated to approximately 55° C. by means of recirculation through the hot exchanger 44.

An aliquot of the Lewisite to be destroyed is introduced into the reactor 11 from vessel 27 to initiate the exothermic oxidation reaction.

The temperature in reactor 11 is allowed to rise under careful control achieved by appropriate direction of the reacting mixture through one or other of the two exchangers 39 and 44. When thermal stability is assured, a continuous flow of Lewisite is permitted to enter the reactor 11 at a rate determined by the capacity of the cold exchanger 39, to remove the heat generated by the reaction and thereby to maintain a constant temperature of at least 75° C. throughout the course of the reaction. In order to avoid loss of temperature control of the oxidation reaction, the Lewisite feed is blended directly and efficiently with the high flow rate, recirculating stream of reactor fluids passing through an in-line mixer 31.

The decrease in pH, resulting from the formation of HCl, a product of the oxidation reaction, is counteracted through the controlled addition of a 20% aqueous solution of NaOH, obtained from vessel 19. Prior to termination of the reaction, the pH is increased to a level of approximately 6 pH units.

The production of a relatively stable foam, which may occasionally form in the reactor as a result of impurities in the Lewisite, is adequately controlled by directing a portion of the recirculating reaction mixture, by means of valve V7, through the spray nozzle 26 located above the liquid surface at the top of the reactor 11.

Upon completion of the oxidation reaction, that is, when the specified quantity of Lewisite has been added and the residual Lewisite in the reaction product mixture has decreased to a level below about 1 mg/L, the remaining hydrogen peroxide is destroyed by passing the reaction mixture through the manganese dioxide catalyst bed in regeneration vessel 50. During the course of this operation, the temperature and pH continue to be controlled by procedures similar to those outlined above.

When the residual peroxide concentration has fallen to a level of less than 0.1%, flow through the catalyst bed in regeneration vessel 50 is discontinued, and NaOH solution from vessel 19 is gradually introduced to the reactor 11, thereby slowly decomposing the arsonic acid at a constant temperature of about 75° C., and eventually elevating the pH to a final level of 11. The decomposition reaction is permitted to continue until the concentration of arsonic acid has decreased to less than 1 mg/L.

The reaction mixture is cooled and removed from the reactor via main flow line 36 to temporary storage in vessel 46. The entire neutralization process described above is, then, repeated through the number of cycles required to eliminate the designated inventory of Lewisite.

The combined volume of fluid reaction products, generated by the above series of neutralizations, is then withdrawn via line 69 and mixed with sodium silicate, sodium sulfate and Portland cement, in the following proportions; 40 parts reaction product, 5 parts sodium silicate, 5 parts sodium sulfate and 50 parts Portland cement, with the aid of conventional cement blending equipment. The resulting mixture is, then, cast in the form of one or more monoliths. The monoliths subject to passing the leachate test results, may be placed into a secure landfill as a generally-acceptable strategy for permanent disposal.

As the result of extensive laboratory and pilot plant investigation, followed by the design, construction and operation of an industrial scale system, it has been determinedthat:thebatchwisemodeofoperationismostefficacious, since it offers greater flexibility in terms of feed capacity or rangeability; it may be controlled more simply and with greater safety, especially in the event of a runaway reaction; it permits the use of a single reaction vessel for oxidation and decomposition; and it limits the quantity of unreacted Lewisite present in the system at any time.

Although a continuous process may be readily devised to effect the destruction of the Lewisite by the process of this invention, a sequential or batchwise approach is preferred, since it provides greater flexibility and controllability.

All surfaces of vessels, pipes, tube, valves, pumps and probes which are contacted by process fluids (liquids and/or gases) should be composed of either glass, TEFLON™ (the registered trade-mark for a brand of polytetrafluoroethylene) or ceramic to resist chemical attack in a strongly oxidizing atmosphere at moderately elevated temperature.

CONCLUSION

Thus, the present invention has provided a process which employs a sequence of chemical reactions effectively to reduce the several species of the vesicant, Lewisite, a warfare agent, to less noxious and readily disposable end products, and the method of operating such a process.

From the foregoing description, one skilled in the art can easily ascertain the essential characteristics of this invention, and without departing from the spirit and scope thereof, can make various changes and modifications of the invention to adapt it to various usages and conditions. Consequently, such changes and modifications are properly, equitably, and "intended" to be, within the full range of equivalence of the following claims.

What I claim is:

1. A sequential process for the destruction of a toxic organic chlorine-containing compound selected from the group consisting of the mustard gases, and the Lewisites, comprising the two sequential steps of: (A) first carrying out an oxidation reaction between said organic chlorine-containing compound and an oxidizing agent by adding said organic chlorine-containing compound to an aqueous solution of said oxidizing agent, while maintaining the temperature within the range of about 50° C. to about 90° C. and the pH starting at about 1 to 2 during said oxidation and terminating at about 5 to about 8, thereby to provide an oxidation reaction product solution; and (B) then converting said oxidation reaction product solution into inorganic compounds by carrying out a neutralization reaction by the addition of an aqueous solution of an alkali to a maximum final pH of about 11.

2. The sequential process as claimed in claim 1 wherein said toxic organic chlorine-containing compound is a Lewisite selected from the group consisting of dichloro-(2-chlorovinyl)arsine, bis(2-chlorovinyl)chloroarsine and tris(2-chlorovinyl)arsine; wherein said oxidation reaction product comprises an organic chlorine-containing arsonic acid; and including the steps of: catalytically decomposing residual oxidizing agent after completion of said oxidation reaction; decomposing said organic chlorine-containing arsonic acid to an inorganic arsenate salt by increasing the pH to an alkaline level; and chemically fixating and disposing of said inorganic arsenate salt.

3. The process of claim 2 wherein said Lewisite is added to said oxidizing agent.

4. The process of claim 2 wherein said oxidizing agent is hydrogen peroxide.

5. The process of claim 4 wherein said hydrogen peroxide is employed as an approximately 5% to 30% aqueous solution.

6. The process of claim 4 wherein said hydrogen peroxide is employed as an approximately 10% to 25% aqueous solution.

7. The process of claim 2 wherein said hydrogen peroxide is used in stoichiometric excess.

8. The process of claim 2 wherein said hydrogen peroxide is used in amount of about 400%.

9. The process of claim 2 wherein said oxidation is carried out at a temperature of about 75° C. to 85° C.

10. The process of claim 2 wherein said oxidation terminates at a pH of about 6.

11. The process of claim 2 wherein said pH is maintained by the addition of sodium hydroxide.

12. The process of claim 4 wherein said catalyst is manganese dioxide.

13. The process of claim 2 wherein said catalytic decomposition is carried out at a pH of about 6.

14. The process of claim 2 wherein said step of decomposing of said organic chlorine-containing arsonic acid to provide inorganic sodium-containing and arsenic-containing salts is carried out with sodium hydroxide at a pH of about 11.

15. The process of claim 2 wherein the total quantity of sodium hydroxide required is about 3 moles per mole of the Lewisites.

16. The sequential process of claim 14 including the step of converting said inorganic sodium-containing and arsenic-containing compound to an inorganic calcium-containing and arsenic-containing compound; and then chemically fixating and decomposing said inorganic calcium-containing and arsenic-containing compound.

17. The process of claim 16 wherein said chemically fixating and disposing of said inorganic calcium-containing and arsenic-containing compound is carried out by the steps of chemically entrapping said inorganic calcium-containing and arsenic-containing compound in silicate by adding sodium silicate and sodium sulfate to said reaction product; and then stabilizing the product so-produced within a cement monolith.

18. The sequential process of claim 1 wherein said toxic, organic chlorine-containing compound is a mustard gas.

19. The sequential process of claim 18 wherein said oxidation reaction product solution is reacted with calcium hypochlorite and calcium hydroxide, thereby to provide calcium sulfate, calcium carbonate and calcium chloride.

* * * * *